(12) United States Patent
Spicer et al.

(10) Patent No.: US 8,726,661 B2
(45) Date of Patent: May 20, 2014

(54) HYBRID POWERTRAIN SYSTEM INCLUDING AN INTERNAL COMBUSTION ENGINE AND A STIRLING ENGINE

(75) Inventors: John Patrick Spicer, Plymouth, MI (US); Kerem Koprubasi, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 954 days.

(21) Appl. No.: 12/852,572

(22) Filed: Aug. 9, 2010

(65) Prior Publication Data

US 2012/0031079 A1 Feb. 9, 2012

(51) Int. Cl.
*F01N 3/10* (2006.01)
*F01N 5/02* (2006.01)
*F02G 1/04* (2006.01)
*F02G 5/02* (2006.01)

(52) U.S. Cl.
USPC .................. 60/618; 60/517; 60/299; 60/320

(58) Field of Classification Search
USPC ........... 60/614–618, 278, 280, 299, 320, 698, 60/516, 517
See application file for complete search history.

(56) References Cited

U.S. PATENT DOCUMENTS

| | | | | |
|---|---|---|---|---|
| 3,768,982 A * | 10/1973 | Kitzner et al. | ................ | 422/174 |
| 4,646,524 A | 3/1987 | Kawashima et al. | | |
| 4,885,017 A * | 12/1989 | Fleischmann | ...................... | 62/6 |
| 5,987,885 A | 11/1999 | Kizer et al. | | |
| 6,318,077 B1 | 11/2001 | Claypole et al. | | |
| 6,543,229 B2 * | 4/2003 | Johansson | ................... | 60/605.1 |
| 6,672,063 B1 | 1/2004 | Proeschel | | |
| 7,181,912 B2 | 2/2007 | Mori | | |
| 7,448,213 B2 * | 11/2008 | Mitani | ........................... | 60/616 |
| 7,490,469 B2 | 2/2009 | Carroll et al. | | |
| 2002/0023741 A1* | 2/2002 | Brenner et al. | ............... | 165/166 |
| 2005/0202933 A1* | 9/2005 | Sorab et al. | ................... | 477/161 |
| 2005/0268604 A1 | 12/2005 | Takahashi et al. | | |
| 2006/0042608 A1* | 3/2006 | Buck et al. | ............... | 123/568.12 |
| 2006/0123779 A1 | 6/2006 | Yaguchi et al. | | |
| 2008/0298785 A1* | 12/2008 | Patel et al. | ................... | 388/820 |
| 2008/0314356 A1 | 12/2008 | Kamen et al. | | |

FOREIGN PATENT DOCUMENTS

| | | | |
|---|---|---|---|
| CN | 101415930 A | | 4/2009 |
| EP | 2098696 A1 | | 9/2009 |
| JP | 2002266701 A | * | 9/2002 |
| JP | 2008-223622 A | | 9/2008 |

OTHER PUBLICATIONS

Ringler, J., Rankine Cycle for Waste Heat Recovery of IC Engines; SAE 2009-01-0174; Warrendale, PA; www.SAE.org.

Kruiswyk, R., An Engine System Approach to Exhaust Waste Heat Recovery; May 21, 2009; DOE Merit Review; Caterpillar, Inc; Washington D.C.; DOE Contract DE-FC26-05NT42423.

Endo, T., Study on Maximizing Exergy in Automotive Engines; SAE 2007-01-0257; SAE World Congress; Apr. 2007; Warrendale, PA.

* cited by examiner

*Primary Examiner* — Thomas Denion
*Assistant Examiner* — Laert Dounis

(57) ABSTRACT

An exhaust aftertreatment system for treating an exhaust gas feedstream of an internal combustion engine includes a catalytic converter, a fluidic circuit and a Stirling engine. The Stirling engine is configured to transform thermal energy from a working fluid heat exchanger to mechanical power that is transferable to an electric motor/generator to generate electric power. The Stirling engine is configured to transform mechanical power from the electric motor/generator to thermal energy transferable to the working fluid heat exchanger.

16 Claims, 2 Drawing Sheets

HYBRID POWERTRAIN SYSTEM INCLUDING AN INTERNAL COMBUSTION ENGINE AND A STIRLING ENGINE

TECHNICAL FIELD

This disclosure is related to hybrid powertrain systems including internal combustion engines.

BACKGROUND

The statements in this section merely provide background information related to the present disclosure and may not constitute prior art.

Hybrid powertrain systems employ internal combustion engines and other non-combustion torque machines to provide tractive torque to propel a vehicle. The non-combustion torque machines use non-fuel power sources, e.g., high-voltage batteries. One powertrain operating strategy includes operating the powertrain using only the non-combustion torque machine to provide the tractive torque. This includes operating the powertrain with the internal combustion engine shut off. This may include automatically shutting off the internal combustion engine during ongoing powertrain operation. This may include operating the hybrid powertrain with the internal combustion engine shut off, and only starting the internal combustion engine when available power from the non-fuel power source is less than a threshold.

Internal combustion engines generate heat and exhaust gases as byproducts of combustion. Known exhaust aftertreatment devices include catalytic materials that react with the exhaust gases at temperatures greater than ambient to oxidize or reduce constituents to inert gases prior to their release into the atmosphere. A portion of the heat generated by the engine is transferred to the exhaust aftertreatment devices, and a portion is lost into the atmosphere. It is known that an exhaust aftertreatment device must reach a threshold temperature to effectively catalyze, filter adsorb, desorb or otherwise treat exhaust gas constituents. One threshold temperature is referred to as a light-off temperature, which indicates exothermic reactions are occurring in the exhaust aftertreatment device. It is known that engine exhaust emissions are greater prior to light-off in an exhaust aftertreatment device. It is preferred to reduce the time to light-off an exhaust aftertreatment device subsequent to starting an internal combustion engine to reduce engine exhaust emissions.

Known heat engines including Stirling-cycle engines are closed-cycle regenerative devices that convert heat to mechanical work by cyclically compressing and expanding a fixed quantity of a working fluid using temperature differentials.

SUMMARY

An exhaust aftertreatment system for treating an exhaust gas feedstream of an internal combustion engine includes a catalytic converter, a fluidic circuit and a Stirling engine. The fluidic circuit includes a working fluid heat exchanger including a first heat transfer surface in fluid contact with the exhaust gas feedstream and a second heat transfer surface. The fluidic circuit contains a working fluid in contact with the second heat transfer surface. The Stirling engine is a closed-cycle regenerating heat engine including a hot side, a cold side and an output member. The hot side is fluidly connected to the fluidic circuit containing the working fluid and the output member mechanically coupled to an electric motor/generator. The Stirling engine is configured to transform thermal energy from the working fluid heat exchanger to mechanical power that is transferable to the electric motor/generator to generate electric power. The Stirling engine is configured to transform mechanical power from the electric motor/generator to thermal energy transferable to the working fluid heat exchanger.

BRIEF DESCRIPTION OF THE DRAWINGS

One or more embodiments will now be described, by way of example, with reference to the accompanying drawings, in which.

DETAILED DESCRIPTION

Figure 1:
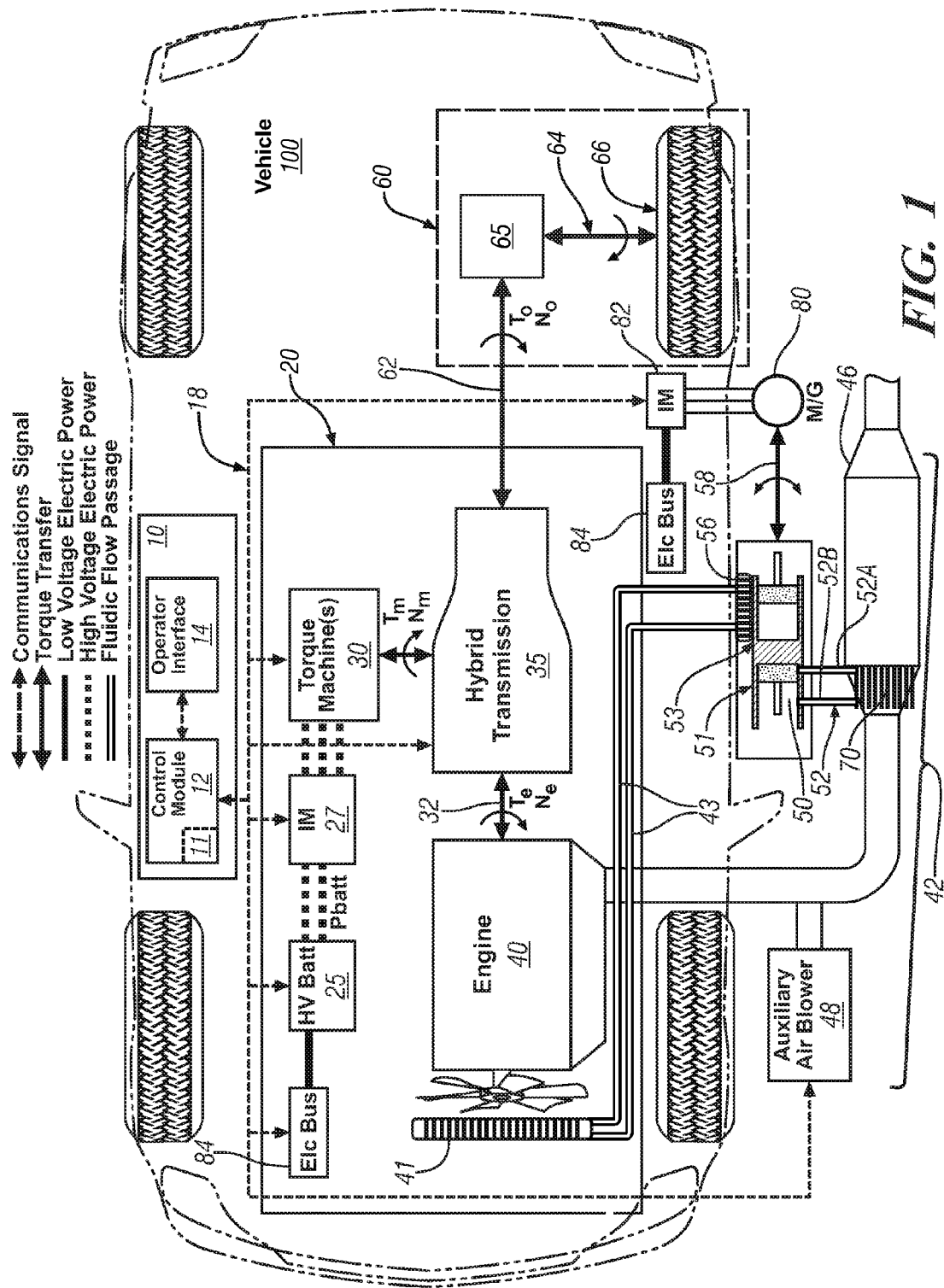
FIG. 1 schematically shows a vehicle including a control system, a hybrid powertrain system, and a driveline in accordance with the present disclosure.

Referring now to the drawings, wherein the showings are for the purpose of illustrating certain exemplary embodiments only and not for the purpose of limiting the same, FIG. 1 schematically shows a vehicle 100 including a control system 10, a hybrid powertrain system 20, and a driveline 60. Like numerals refer to like elements in the description. The hybrid powertrain system 20 includes an internal combustion engine 40, hereafter referred to as engine 40, and torque machine(s) 30 that mechanically couple to a hybrid transmission 35.

The engine 40 is preferably a multi-cylinder fuel injection internal combustion engine that converts fuel to mechanical power through a combustion process. The engine 40 is equipped with a plurality of actuators and sensing devices for monitoring operation and delivering fuel to form a combustion charge to produce torque that is responsive to an operator torque request. In one embodiment, the engine 40 is configured to operate as a spark-ignition engine with timing of combustion and the associated engine torque being controlled by advancing or retarding spark ignition timing. Alternatively, the engine 40 is configured to operate as a compression-ignition engine with timing of combustion and the associated engine torque controlled by advancing or retarding timing of fuel injection events. It is appreciated that there is a preferred combustion timing associated with engine operation corresponding to a best fuel efficiency point for an engine operating point. In one embodiment this best fuel efficiency point is referred to as a mean-best torque (MBT) point.

A high-voltage battery (HV Batt) 25 stores potential electric energy and is electrically connected via an inverter (IM) 27 to the torque machine(s) 30 to transfer electric power therebetween. It is appreciated that the high-voltage battery 25 is an electric energy storage device that can include a plurality of electrical cells, ultracapacitors, and other devices configured to store electric energy on-vehicle. One exemplary high-voltage battery 25 includes a plurality of lithium-ion cells. Parametric states associated with the high-voltage battery 25 include a state-of-charge, temperature, available voltage, and available battery power, which are monitored by the control system 10. It is appreciated that battery power is measured in terms of a parameter that can be regularly monitored, e.g., state of charge (SOC), or another suitable parameter.

The torque machine(s) 30 preferably include multi-phase electric motor/generators electrically connected to the inverter 27. The torque machine(s) 30 interacts with the inverter 27 to convert stored electric energy from the high-voltage battery 25 to mechanical power and convert mechanical power to electric energy that can be stored in the high-voltage battery 25.

Mechanical power originating in the engine 40 can be transferred via an input member 32 and the hybrid transmission 35 to the output member 62 and the torque machine(s) 30. Operating parameters associated with such input power from the engine 40 include engine torque $T_e$ and engine speed $N_e$.

Mechanical power originating from the torque machine(s) 30 can be transferred via the hybrid transmission 35 to the output member 62 and the engine 40. Operating parameters associated with such mechanical power transfer include motor torque $T_m$ and motor speed $N_m$. Mechanical power can be transferred between the hybrid transmission 35 and the driveline 60 via the output member 62. Operating parameters associated with such mechanical power transfer include output torque $T_O$ and output speed $N_O$.

The driveline 60 can include a differential gear device 65 that mechanically couples to an axle 64 or half-shaft that mechanically couples to a wheel 66 in one embodiment. The differential gear device 65 is coupled to the output member 62 of the hybrid powertrain system 20, and transfers output power therebetween. The driveline 60 transfers tractive power between the hybrid transmission 35 and a road surface.

The control system 10 includes a control module 12 that is signally connected to an operator interface 14. The control module 12 includes a low-voltage electric power supply to provide regulated electric power thereto. It is appreciated that there is a plurality of human/machine interface devices through which the vehicle operator commands operation of the vehicle 100, including, e.g., an ignition switch to enable an operator to crank and start the engine 40, an accelerator pedal, a brake pedal, and a transmission range selector (PRNDL). Although the control module 12 and operator interface 14 are shown as individual discrete elements, such an illustration is for ease of description. It is appreciated that the functions described as being performed by the control module 12 may be combined into one or more devices, e.g., implemented in software, hardware, and/or application-specific integrated circuitry (ASIC) and ancillary circuits that are separate and distinct from the control module 12. It is appreciated that information transfer to and from the control module 12 can be accomplished using one or more communications paths, e.g., communications bus 18, which can include one or more of a direct connection, a local area network bus, and a serial peripheral interface bus.

The control module 12 preferably signally and operatively connects to individual elements of the hybrid powertrain system 20 via the communications bus 18. The control module 12 signally connects to the sensing devices of each of the high-voltage battery 25, torque machine(s) 30, engine 40, and the hybrid transmission 35 to monitor operation and determine parametric states thereof.

The control module 12 executes control schemes to control operation of the engine 40 coordinated with controlling overall operation of the hybrid powertrain system 20 to manage transfer of mechanical power to the driveline 60 and to manage electric power flow to the high-voltage battery 25. Such control schemes include balancing operation of the engine 40 with allowable battery power limits associated with the high-voltage battery 25 while achieving an output torque to the driveline 60 that is responsive to an operator torque request. This includes controlling operation of the engine 40 to achieve a preferred engine speed associated with a peak or otherwise preferred efficiency.

The engine 40 includes an exhaust system that entrains and channels engine exhaust gas to an exhaust aftertreatment system 42. It is appreciated that the exhaust aftertreatment system 42 is configured to convert exhaust gas constituents to inert gases that are expelled to the atmosphere in the presence of one or more catalytic elements contained therein.

The exhaust aftertreatment system 42 includes one or more catalytic converter(s) 46 and a working fluid heat exchanger 70. The working fluid heat exchanger 70 includes a first heat transfer surface in contact with and exposed to the exhaust gas feedstream. The working fluid heat exchanger 70 includes a second heat transfer surface that is part of a working fluid circuit 52 of a Stirling engine 50 and contains a working fluid. The working fluid can include, e.g., helium, hydrogen, or another suitable gaseous fluid having high heat transfer characteristics. It is appreciated that heat transfer may be in the form of conductive, convective and radiant heat transfer, depending upon the particular application. It is appreciated that a skilled practitioner can apply known heat transfer equations to determine magnitude of heat transfer corresponding to the particular application and factors associated therewith.

Figure 2:
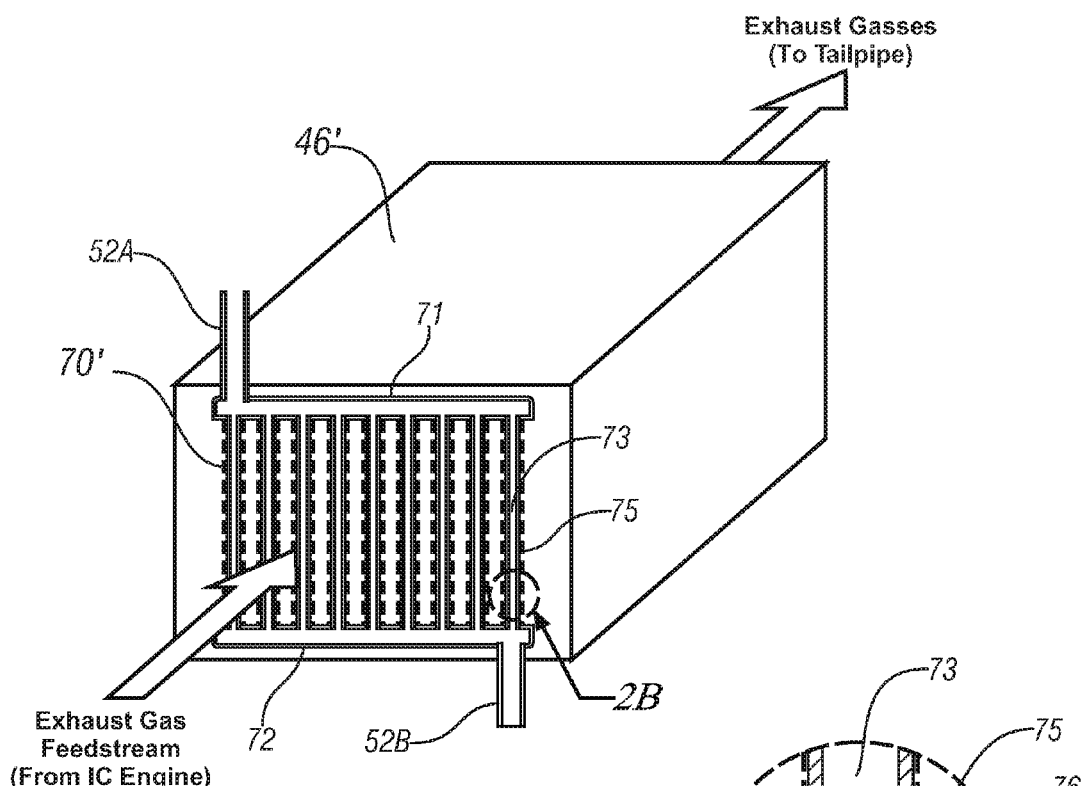
FIG. 2 including FIG. 2B schematically shows a working fluid heat exchanger integrated into an exhaust aftertreatment system in accordance with the present disclosure.

The working fluid circuit 52 includes an inlet heat exchange flow passage 52A fluidly connected to the working fluid heat exchanger 70 and fluidly connected to an outlet heat exchange flow passage 52B. As depicted, the exhaust aftertreatment system 42 includes a single working fluid heat exchanger 70 located in the exhaust gas feedstream upstream of catalytic converter(s) 46. Alternatively, a working fluid heat exchanger 70' may be integrated into the exhaust aftertreatment system 42 as one of the catalytic converter(s) 46, as depicted in FIG. 2. The working fluid heat exchanger 70 is depicted as being upstream of the catalytic converter(s) 46 in FIG. 1. It is appreciated that the working fluid heat exchanger 70 can be located in the exhaust gas feedstream downstream of a first of the catalytic converter(s) 46 and upstream of a second of the catalytic converter(s), or other following catalytic converter(s). One skilled in the art can conceive of other suitable configurations of the exhaust aftertreatment system 42 including the working fluid heat exchanger 70 and one or more catalytic converter(s) 46.

Figure 2B:
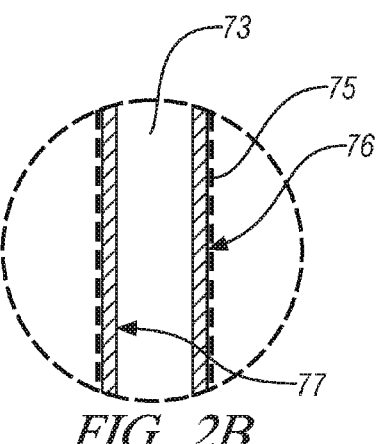

FIG. 2 shows an embodiment of a catalytic converter 46' that includes the working fluid heat exchanger 70' integrated therein as a plate-type heat exchanger 70' having first and second heat transfer surfaces 76 and 77, respectively. The first heat transfer surface 76 forms a substrate that can be coated with a washcoat 75, shown in detail with reference to FIG. 2B. The plate-type heat exchanger 70' includes an inlet manifold 71 fluidly connected to the inlet heat exchange flow passage 52A of the working fluid circuit 52 of the Stirling engine 50 and an outlet manifold 72 fluidly connected to the exhaust heat exchange flow passage 52B of the working fluid circuit 52 of the Stirling engine 50. The plate-type heat exchanger 70' includes a multiplicity of hollow plates 73 that are located in and preferably oriented such that their planar surfaces are parallel to a flow stream of the exhaust gas feedstream. Each of the hollow plates 73 has first and second heat transfer surfaces 76 and 77, respectively. The hollow plates 73 are fluidly connected in parallel between the inlet manifold 71 and the outlet manifold 72, and the working fluid flows therethrough, contacting the second heat transfer surface 77. The first heat transfer surface 76 is exposed to the exhaust gas feedstream. The first heat transfer surface 76 of the working fluid heat exchanger 70 is coated with a washcoat 75 that preferably includes a selected catalytic material. In one embodiment the selected catalytic material of the washcoat 75 includes platinum to achieve oxidation reactions in the exhaust gas feedstream. Other suitable catalytic materials may be used, depending upon specifics of the powertrain application and the exhaust gas feedstream.

FIG. 1 further shows an optional auxiliary air blower 48 that is configured to pump ambient air into the exhaust gas feedstream upstream of the working fluid heat exchanger 70 and the catalytic converter(s) 46. The control module 12 connects to the auxiliary air blower 48 to control operation thereof. The optional auxiliary air blower 48 is unnecessary when the working fluid heat exchanger 70 is integrated into the catalytic converter(s) 46 with the first heat transfer surface 76 of the working fluid heat exchanger 70 having a washcoat 75 including catalytic material as described hereabove with reference to FIG. 2.

The working fluid heat exchanger 70 that is inserted into the exhaust gas feedstream upstream of catalytic converter(s) 46 is configured to transfer heat between the exhaust gas feedstream and the working fluid circulating therethrough. It is appreciated that the direction of heat transfer, i.e., from the exhaust gas feedstream to the circulating working fluid, or from the circulating working fluid to the exhaust gas feedstream is dependent upon a temperature differential between the exhaust gas feedstream and the circulating working fluid.

The engine 40 includes a fluidic cooling system including a radiator 41 providing air/fluid heat exchange capability. The radiator 41 fluidly connects to cooling circuits in the engine 40. The radiator 41 also fluidly connects to a heat exchanger 56 thermally connected to a cold side 53 of the Stirling engine 50, preferably via an auxiliary cooling circuit 43.

The Stirling engine 50 is a closed-cycle regenerating heat engine including a hot side 51 with an expansion cylinder and a power piston and the cold side 53 with a compression cylinder and a displacer piston. A fixed quantity of the working fluid is permanently contained within the hot side 51 and the working fluid circuit 52. The hot side 51 of the Stirling engine 50 fluidly connects to the inlet and outlet heat exchange flow passages 52A and 52B of the working fluid circuit 52 that includes the working fluid heat exchanger 70 and circulates the working fluid therethrough. The cold side 53 of the Stirling engine 50 is thermally connected to the auxiliary cooling circuit 43 using the heat exchanger 56. A preferred configuration for the Stirling engine 50 preferably includes a beta-type Stirling engine. Alternatively an alpha-type Stirling engine and a gamma-type Stirling engine may be suitably employed.

The output member 58 of the Stirling engine 50 includes a rotatable or linear shaft that is mechanically coupled to an electric motor/generator 80. The electric motor/generator 80 is an asynchronous induction motor in one embodiment configured to operate at a relatively low voltage level, e.g., 20 V. Alternatively electric motor/generator 80 is a multiphase synchronous motor configured to operate at a relatively higher voltage level. The electric motor/generator 80 electrically connects to an electric power inverter module 82 to converter and transfer electric power. The electric power inverter module 82 electrically connects via an electric power bus 84 to an energy storage device. In one embodiment, the electric power bus 84 is a low voltage bus connected to a battery. In one embodiment the electric power bus 84 connects to the high-voltage battery 25, e.g., via a DC/DC transformer. The electric power inverter module 82 is signally connected to the control system 10 via the communications bus 18 in one embodiment.

The Stirling engine 50 converts externally supplied heat energy, e.g., from the working fluid heat exchanger 70 located in the exhaust gas feedstream, to mechanical work that is output to the output member 58 by repetitively cycling the working fluid through a compression-heat-expansion-cooling sequence. The magnitude of mechanical work output from the Stirling engine 50 corresponds to a temperature differential between the expansion cylinder on the hot side 51 and the compression cylinder on the cold side 53. The Stirling engine 50 can also operate as a heat pump by applying mechanical force to the output member 58 to drive the expansion cylinder and the compression cylinder, thus generating heat on the hot side 51 of the Stirling engine 50 that can be transferred to the working fluid for circulating in the working fluid circuit 52 to the working fluid heat exchanger 70.

The aforementioned system can be controlled to operate in an electric power generating mode and a heat pump mode.

Operation in the electric power generating mode is as follows. During operation of the engine 40, the exhaust gas feedstream can be at a temperature that may be 450° C. or greater with ambient temperature less than 50° C., with a portion of the heat contained in the exhaust gas feedstream expelled into the atmosphere as waste heat. The Stirling engine 50 recovers a portion of the waste heat in the exhaust gas feedstream using the working fluid heat exchanger 70, which it converts to mechanical work to generate electric power using the electric motor/generator 80 in an electric power generating mode. The generated electric power can be stored in the high-voltage battery 25. The electric power generated using the Stirling engine 50 can offset electric power generated by burning fuel in the engine 40, thus reducing overall fuel consumption. It is appreciated that the magnitude of electric power that is extracted from the waste heat is a function of the magnitude of heat transfer from the exhaust gas feedstream to the working fluid, the temperature differential between the working fluid and the coolant in the auxiliary cooling circuit 43, the thermal efficiency of the Stirling engine 50, and electrical efficiency of the electric motor/generator 80. The magnitude of heat transfer from the exhaust gas feedstream to the working fluid is a function of the size, design, and heat transfer capacity of the working fluid heat exchanger 70. The hybrid powertrain system 20 can advantageously use the Stirling engine 50 to generate electric power because the control system 10 preferentially operates the engine 40 at speed/load operating points that optimize engine thermal efficiency, resulting in relatively high temperatures in the exhaust gas feedstream.

Operation in the heat pump mode is as follows. The engine 40 is in an off state. This includes the engine 40 being off prior to a key-on start. This includes the engine 40 being commanded off during vehicle operation when the hybrid powertrain 20 executes an autostop event to stop the engine 40 while continuing to operate using electric energy to generate tractive power. This includes the engine 40 being in the off state during vehicle operation when the hybrid powertrain 20 operates using electric energy to generate tractive power and periodically commands the engine 40 to operate to generate electric power to recharge the high-voltage battery 25. In any of the aforementioned events, residual heat contained in the exhaust aftertreatment system 42 can dissipate and temperature of the exhaust aftertreatment system 42 can approach an ambient temperature. Prior to executing an engine start, the control module 12 operates the electric motor/generator 80 in an electric motor mode to generate torque that is transferred to the Stirling engine 50. The Stirling engine 50 operates as a heat pump to compress the working fluid and generate heat that is transferred to the working fluid heat exchanger 70. The control module 12 can operate the optional auxiliary air pump 48 to pump air into the exhaust gas feedstream that passes the working fluid heat exchanger 70 and transfers heat to the catalytic converter(s) 46. It is appreciated that in an embodiment wherein the working fluid heat exchanger 70 is integrated into the catalytic converter(s) 46, heat generated when the Stirling engine 50 operates as a heat pump is transferred without a need for the auxiliary air pump 48. The heat transfer to the catalytic converter(s) 46 reduces engine operating time required to achieve light-off of the catalytic converter(s) 46, thus reducing exhaust emissions associated with an engine start event, including either of a cold-start and a restart.

The working fluid circuit 52 including the working fluid heat exchanger 70 may be a single continuous flow circuit including a single inlet heat exchange flow passage 52A for the working fluid and a single outlet heat exchange flow passage 52B for the working fluid.

Alternatively, the working fluid circuit 52 may include the working fluid heat exchanger 70 as a parallel flow heat exchange device including an inlet manifold and an outlet manifold and having a plurality of parallel inlet and outlet heat exchange flow passages 52A and 52B therebetween.

In one embodiment, the working fluid circuit 52 includes a plurality of inlet and outlet heat exchange flow passages 52A and 52B that are all located such that the associated first heat transfer surfaces are exposed in a single working fluid heat exchanger 70 to a single element in a single location, e.g., the exhaust gas feedstream upstream of the catalytic converter 46.

Figure 3:
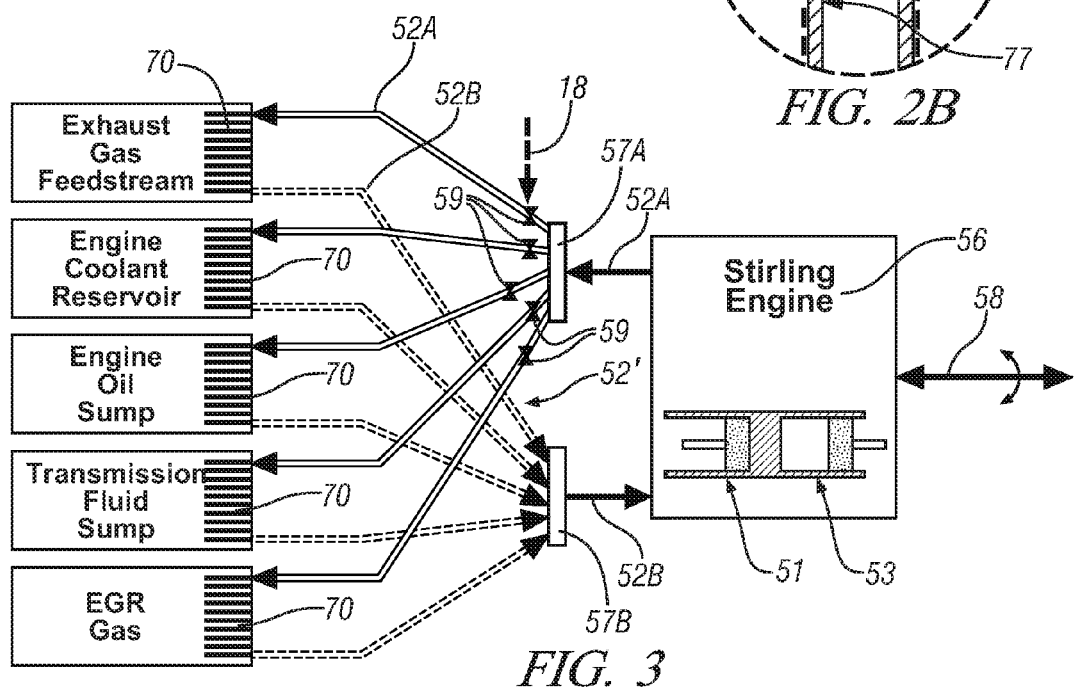
FIG. 3 schematically shows a working fluid circuit including a plurality of inlet and outlet heat exchange flow passages fluidly coupled to a Stirling engine through inlet and return manifolds in accordance with the present disclosure.

FIG. 3 schematically shows a working fluid circuit 52' that includes the inlet and outlet heat exchange flow passages 52A and 52B fluidly connected to the hot side 51 of the Stirling engine 50 through an inlet manifold 57A and an outlet manifold 57B. In one embodiment the inlet manifold 57A optionally includes a plurality of selectively actuable flow control valves 59. This arrangement permits the inlet and outlet heat exchange flow passages 52A and 52B to be fluidly connected in parallel to a plurality of working fluid heat exchangers 70 thermally connected to a plurality of heatable elements in a corresponding plurality of different locations, e.g., the exhaust gas feedstream upstream of the catalytic converter 46, transmission fluid contained in a transmission oil sump, engine oil contained in an engine oil sump, engine coolant contained in a coolant reservoir, recirculated exhaust gas (EGR gas) via an EGR gas heat exchange device, and other heat sources.

In one embodiment, each of the selectively actuable flow control valves 59 is connected to the control module 12 via communications bus 18, which can be used to individually control and manage flow of the working fluid to each of the aforementioned elements. The Stirling engine 50 operates to convert externally supplied heat energy, e.g., from one or a plurality of the working fluid heat exchangers 70 to mechanical work that is output to the output member 58. The Stirling engine 50 can also operate as a heat pump by applying mechanical force to the output member 58 to drive the expansion cylinder and the compression cylinder, thus generating heat on the hot side 51 of the Stirling engine 50 that can be transferred to the working fluid for circulating in the working fluid circuit 52 to a selected one of or several of the plurality of working fluid heat exchangers 70.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An exhaust aftertreatment system for treating an exhaust gas feedstream of an internal combustion engine, including:
   a catalytic converter;
   a fluidic circuit comprising a working fluid heat exchanger inserted into the exhaust gas feedstream upstream of the catalytic converter, the working fluid heat exchanger including a first heat transfer surface in fluid contact with the exhaust gas feedstream and a second heat transfer surface, wherein the fluidic circuit contains a working fluid in contact with the second heat transfer surface;
   a Stirling engine comprising a closed-cycle regenerating heat engine including a hot side, a cold side and an output member, the hot side fluidly connected to the fluidic circuit containing the working fluid and the output member mechanically coupled to an electric motor/generator;
   the Stirling engine configured to transform thermal energy from the working fluid heat exchanger to mechanical power transferable to the electric motor/generator to generate electric power;
   the Stirling engine configured to transform mechanical power from the electric motor/generator to thermal energy transferable to the working fluid heat exchanger; and
   an auxiliary air blower configured to pump ambient air into the exhaust gas feedstream upstream of the working fluid heat exchanger and the catalytic converter, the working fluid heat exchanger configured to transfer thermal energy to the ambient air pumped into the exhaust gas feedstream prior to flowing through the catalytic converter.

2. The exhaust aftertreatment system of claim 1, wherein the Stirling engine is configured to operate as a heat pump to transform mechanical power from the electric motor/generator to thermal energy in the working fluid that is transferable to the working fluid heat exchanger.

3. The exhaust aftertreatment system of claim 1, further comprising a second heat exchanger thermally connected to the cold side of the Stirling engine.

4. The exhaust aftertreatment system of claim 3, further comprising a coolant circuit of the internal combustion engine fluidly connected to the second heat exchanger.

5. The exhaust aftertreatment system of claim 1, further comprising an inverter module electrically connected to an electric power bus, said inverter module electrically connected to the electric motor/generator device.

6. The exhaust aftertreatment system of claim 1, further comprising a catalytic washcoat in fluid contact with the exhaust gas feedstream disposed on the first heat transfer surface.

7. The exhaust aftertreatment system of claim 6, wherein the working fluid heat exchanger comprises a plate-type heat exchanger.

8. An exhaust aftertreatment system for an internal combustion engine, comprising:
   a fluidic circuit comprising a working fluid heat exchanger inserted into an exhaust gas feedstream upstream of an exhaust aftertreatment device, the working fluid heat exchanger including a first heat transfer surface in fluid contact with the exhaust gas feedstream and a second heat transfer surface, wherein the fluidic circuit contains a working fluid in contact with the second heat transfer surface;

a Stirling engine comprising a closed-cycle regenerating heat engine including a hot side, a cold side and an output member, the hot side fluidly connected to the fluidic circuit containing the working fluid, the cold side thermally coupled to an engine coolant circuit, and the output member mechanically coupled to an electric motor/generator;

the Stirling engine configured to transform thermal energy from the working fluid heat exchanger to mechanical power transferable to the electric motor/generator to generate electric power;

the Stirling engine configured to transform mechanical power from the electric motor/generator to thermal energy transferable to the exhaust aftertreatment device via the working fluid heat exchanger; and an auxiliary air blower configured to pump ambient air into the exhaust gas feedstream upstream of the working fluid heat exchanger and the exhaust aftertreatment device, the working fluid heat exchanger configured to transfer thermal energy to the ambient air pumped into the exhaust gas feedstream prior to flowing through the exhaust aftertreatment device.

9. The exhaust aftertreatment system of claim 8, further comprising a catalytic washcoat disposed on the first heat transfer surface of the working fluid heat exchanger.

10. A system for transferring heat energy in a hybrid powertrain system including an internal combustion engine, including:

a Stirling engine comprising a closed-cycle regenerating heat engine including a hot side, a cold side and an output member, the hot side fluidly connected to a fluidic circuit containing a working fluid, the cold side thermally coupled to a coolant circuit, and the output member mechanically coupled to an electric motor/generator electrically connected to an inverter module electrically connected to an electric power bus;

a catalytic converter;

the fluidic circuit including a first working fluid heat exchanger inserted into an exhaust gas feedstream upstream of the catalytic converter, the working fluid heat exchanger including a first heat transfer surface thermally connected to the exhaust gas feedstream and a second heat transfer surface in thermal contact with the working fluid;

the fluidic circuit further including a plurality of additional working fluid heat exchangers each including a first heat transfer surface thermally connected to one of a plurality of heatable elements associated with the hybrid powertrain system;

the Stirling engine configured to transform thermal energy transferred from the exhaust gas feedstream and the plurality of heatable elements associated with the hybrid powertrain system to mechanical power transferable to the electric motor/generator to generate electric power;

the Stirling engine configured to transform mechanical power from the electric motor/generator to thermal energy transferable to the first working fluid heat exchanger and the plurality of additional working fluid heat exchangers; and an auxiliary air blower configured to pump ambient air into the exhaust gas feedstream upstream of the first working fluid heat exchanger and the catalytic converter, the first working fluid heat exchanger configured to transfer thermal energy to the ambient air pumped into the exhaust gas feedstream prior to flowing through the catalytic converter.

11. The system of claim 10, wherein the fluidic circuit further comprises a plurality of flow control valves, each flow control valve configured to control flow of the working fluid to a respective one of the first and the plurality of additional working fluid heat exchangers.

12. The system of claim 10, further comprising a catalytic washcoat in fluid contact with the exhaust gas feedstream disposed on the first heat transfer surface.

13. The system of claim 10, wherein one of the heatable elements comprises transmission fluid contained in a transmission fluid sump.

14. The system of claim 10, wherein one of the heatable elements comprises engine oil contained in an engine oil sump.

15. The system of claim 11, wherein one of the heatable elements comprises engine coolant contained in a coolant reservoir.

16. The system of claim 12, wherein one of the heatable elements comprises recirculated exhaust gas.

* * * * *